Figure 1:
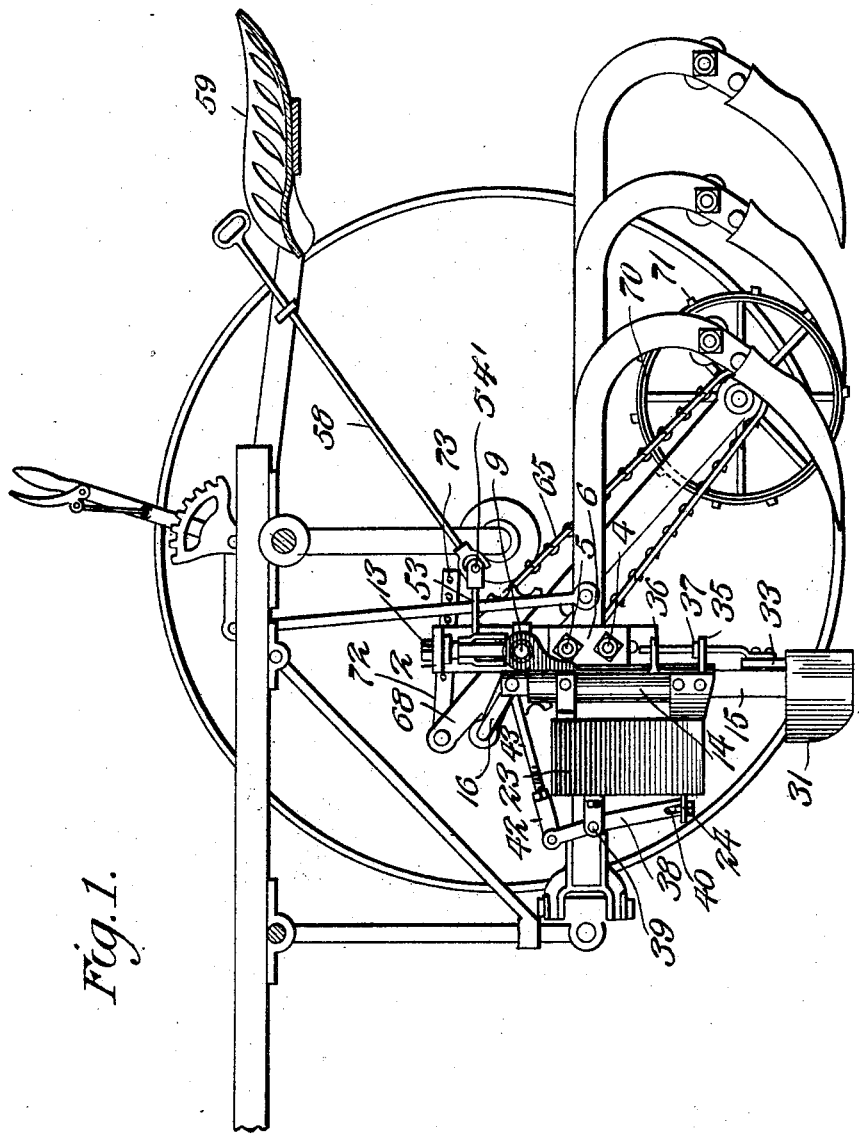

D. J. KERGER.
CORN PLANTER.
APPLICATION FILED JAN. 21, 1908.

902,415.

Patented Oct. 27, 1908.
3 SHEETS—SHEET 1.

Witnesses

Inventor
Desire J. Kerger
By Victor J. Evans.
Attorney

D. J. KERGER.
CORN PLANTER.
APPLICATION FILED JAN. 21, 1908.
902,415.
Patented Oct. 27, 1908.
3 SHEETS—SHEET 2.
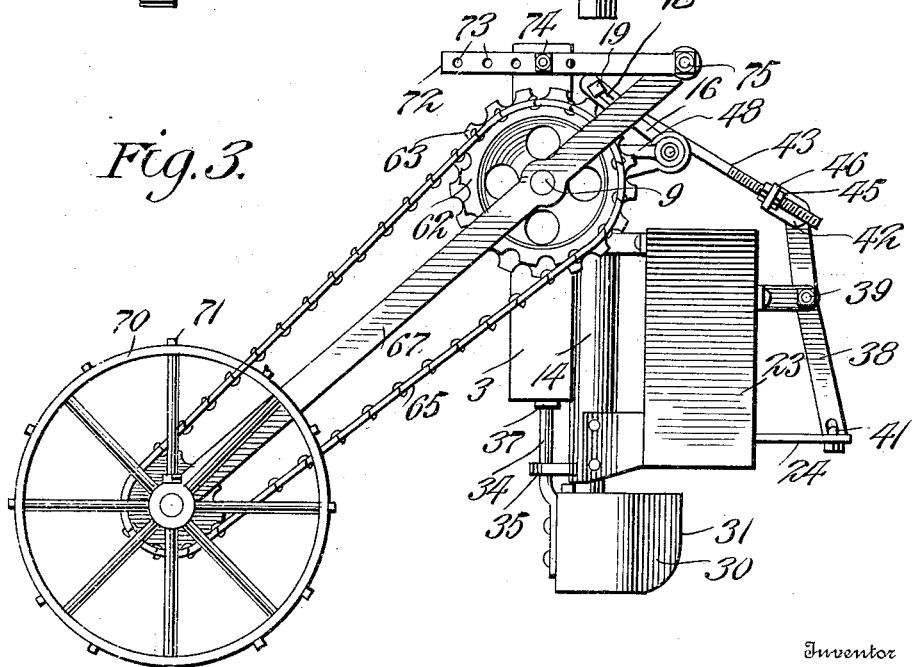

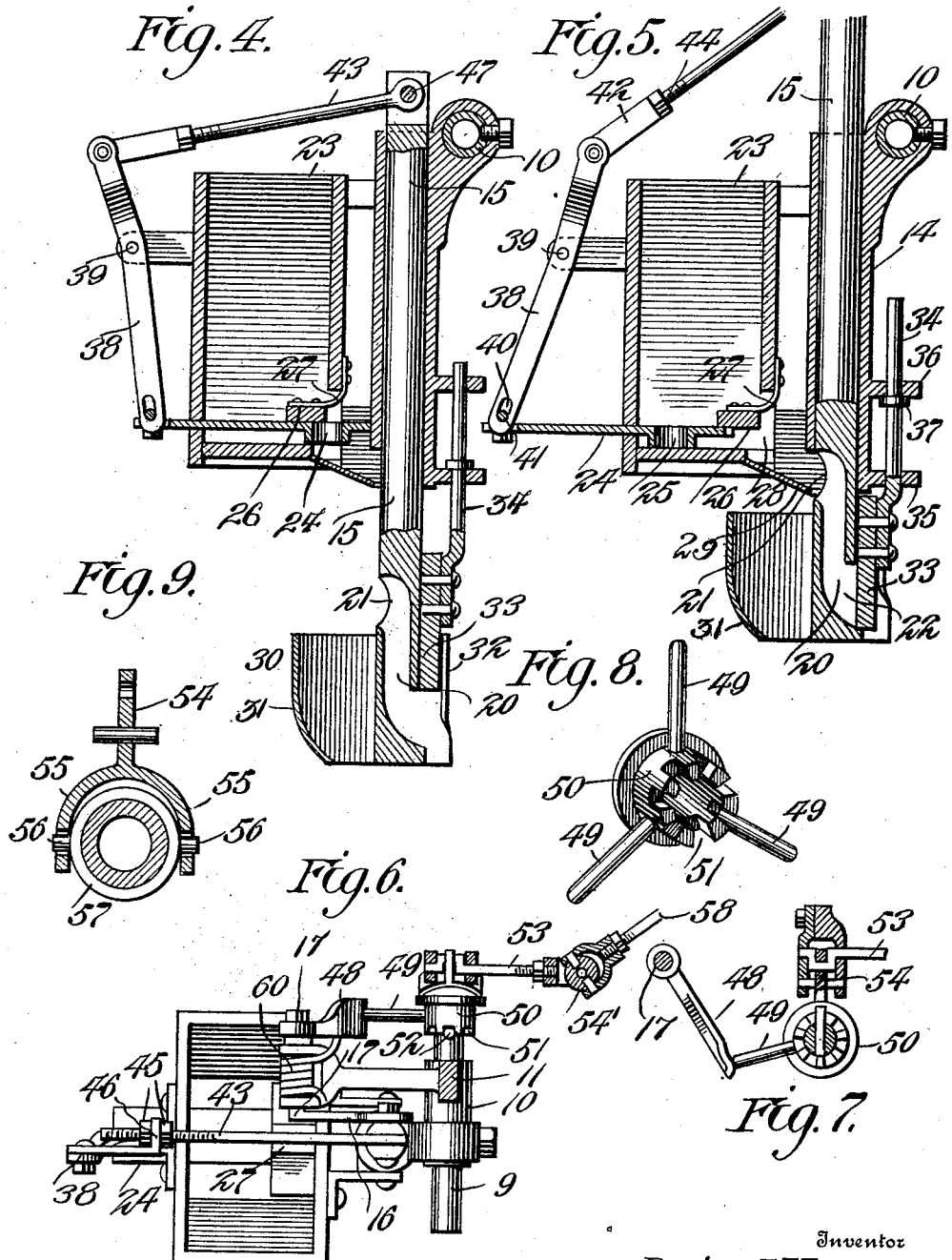

UNITED STATES PATENT OFFICE.

DESIRE J. KERGER, OF ST. ANNE, ILLINOIS.

CORN-PLANTER.

No. 902,415.  Specification of Letters Patent.  Patented Oct. 27, 1908.

Application filed January 21, 1908. Serial No. 411,951.

*To all whom it may concern:*

Be it known that I, DESIRE J. KERGER, a citizen of the United States, residing at St. Anne, in the county of Kankakee and State of Illinois, have invented new and useful Improvements in Corn-Planters, of which the following is a specification.

This invention relates to corn planters and the object of the invention is to provide an automatic checkless single row corn planter which will effect the great saving of labor, and which may be easily and quickly attached to any kind of a riding or walking cultivator and adjusted in proper relation thereto so as to operate smoothly and with accuracy as the cultivator is drawn across the field.

While the machine is especially designed for use as a corn planter, it may be, with equal facility, used as a planter or replanter for beans, peas and other seed.

In the accompanying drawings:—Figure 1 is a side elevation showing the corn planting attachment applied to an ordinary wheeled cultivator. Fig. 2 is a front elevation of the attachment disconnected from the cultivator. Fig. 3 is a side elevation of the attachment. Fig. 4 is a vertical sectional view taken through the hopper and adjacent parts. Fig. 5 is a similar view showing the shoe or furrow opener and its attached parts elevated. Fig. 6 is a sectional plan view of the attachment taken below the supporting frame, a portion of which is shown in section. Fig. 7 is a detail section illustrating the clutch operating mechanism. Fig. 8 is a detail perspective view of the clutch. Fig. 9 is a sectional view showing the connection between the clutch and clutch lever.

In order to adapt the attachment to be applied to and connected with any ordinary riding or walking cultivator such as is shown in Fig. 1, the attachment comprises a main attaching and supporting frame which is substantially L-shaped, comprising a vertical portion 1 and a horizontal portion 2, as clearly shown in Fig. 2. The portion 1 is provided with a plurality of holes 3 adapted to receive bolts 4 which pass through the frame portion 1 and also through a clamping plate 6 whereby the apparatus as a whole may be mounted and fastened upon one of the beams 7 of the cultivator as clearly indicated in Fig. 2.
Extending downward from the horizontal portion 2 of the main frame is a pendent hanger 8 in which the transmission shaft 9 of the attachment is mounted, said shaft being also journaled in the upright portion 1 of the frame. 10 designates another bearing adjacent to the outer end of the shaft 9 which bearing is supported by an L-shaped extension 11 of the hanger 8. The hanger 8 is adjustable in and out on the horizontal portion 2 of the frame by providing said frame with a plurality of holes 12 adapted to receive the bolts 13 by which the hanger 8 is secured to the main frame. This adapts the attachment to cultivators of different widths and sizes.

Connected to the outer bearing 10 is a dropper guide or casing 14 in which is a vertically reciprocating seed dropper 15 which is moved upward and downward by the lever arm 16 of an oscillating rock shaft 17 to which motion is imparted by means hereinafter described. The lever arm 16 is provided near its free end with a slot 18 in which works a pin 19 carried by the upper end of the seed dropper 15 so that as the lever arm 16 is vibrated, the seed dropper is reciprocated vertically.

The lower end portion of the seed dropper 15 is hollowed out to form an ogee-shaped passage 20 the upper end of which opens out at one side of the dropper to form a seed inlet orifice 21 while the opposite end opens out at the opposite side to form a discharge orifice 22. Just in front of the seed dropper there is arranged a seed hopper 23 and slidingly mounted on top of the bottom of said hopper is a sliding feeder 24 provided within the hopper with a seed pocket 25 open at both top and bottom, as clearly shown in Figs. 4 and 5. The feeder 24 slides over the floor of the hopper upon which it rests and also slides beneath a spring pressed cut off 26 which is held in close contact with the upper surface of the feeder 24 by means of a spring 27 secured to the adjacent portion of the hopper as shown in said figures. The hopper is also provided with a discharge opening 28 beneath which is an incline 29 forming a chute which leads directly to the inlet orifice 21 of the said dropper when the latter is elevated to the position shown in Fig. 5. When the seed dropper moves downward, the body thereof forms a cut off for the seed and prevents any more seed from entering the passage 20. Secured to the lower portion of said dropper is a shoe 30 which is preferably formed of sheet metal bent and brought to a sharp edge forward as shown at 31 so as to divide the soil which may be in its way, the sides of the shoe being secured to opposite sides of the dropper and extended slightly in rear thereof where the edges are turned inward toward each other to form guide flanges 32 between which and the adjacent rear face of the dropper 15 is arranged a vertically movable slide or secondary cut off 33 adapted to open and close the discharge orifice 22 as the dropper is raised and lowered. The sliding gate or cut off 33 is provided with an upwardly extending stem 34 which passes through guide openings in stop lugs 35 and 36 while between said stop lugs the stem is provided with an annular stop shoulder 37. The guides 35 and 36 and shoulder 37 are so relatively arranged that when the dropper is raised to the upper limit of its movement, as shown in Fig. 5, the gate or cut-off closes the discharge orifice 22. As the dropper moves downward, the gate moves with it and keeps the discharge orifice 22 closed until just before the dropper reaches the lower limit of its movement when the shoulder 37 is stopped by the lug 35 and just before the downward movement of the dropper is completed, the discharge orifice 22 is opened thereby allowing the seed contained in said dropper to pass outward into the furrow.

The feeder 24 is operated alternately with the dropper 15 by means of a feeder lever 38 which is fulcrumed intermediate its ends at 39 and provided with a slot 40 which receives a pin 41 on the outer end of the feeder 24. The opposite end of the lever has pivotally connected thereto one member 42 of a longitudinal extensible connection, the other member 43 of which is in the form of a rod having a screw threaded portion 44 upon which nuts 45 are placed at opposite sides of a laterally projecting lip 46 on the member 42, thereby providing for adjusting the distance between the lever 38 and the dropper 15, and correspondingly varying the throw of the feeder 24. The connection 43 is pivotally connected at 47 to the dropper 15, and if desired, the bolt or pin may be used for connecting the lever arm 18 and the connecting rod 33 with the dropper. By thus varying the throw of the sliding feeder 24, the pocket 25 may be wholly or only partially uncovered by the cut off 26 thereby adapting the machine to be used for planting peas, beans and other small seed as well as corn.

In order to operate the dropper and feeder hereinabove described, the shaft 17 is provided with another lever arm 48 which lies in the path of one or more operating fingers 49 carried by a clutch 50 which is adapted to turn loosely on the shaft 9.

The clutch 50 is provided in its working face with sets of oppositely arranged notches 51 adapted to engage and interlock with a pin 52 inserted through and projecting from the opposite sides of the shaft 9 so that when the clutch is moved into engagement with the pin 52 said clutch is caused to rotate with the shaft 9 thereby moving the fingers 49 into engagement with the lever arm 48 and operating the feed and dropping mechanism above described. One, two, or more fingers 49 may be provided for increasing or diminishing the number of operations of the dropper, the clutch 50 being provided with a plurality of sockets to receive the fingers 49, any number of which may be used as shown in Fig. 8.

The clutch is operated by means of a small crank shaft 53 which engages a fork 54, the arms 55 of which receive studs or trunnions 56 on a ring 57 which works in a groove in the clutch 50. The shaft 53 is mounted in suitable bearings on the frame and is connected by a universal joint at 54' with a clutch operating rod 58 which extends to a point within convenient reach of the driver's seat 59 who by turning the rod 58 may throw the clutch 50 into and out of engagement with the pin 52. He is thus enabled to stop and start the dropping mechanism at will. The lever arms 16 and 48 are held normally upward by means of a coiled spring 60 shown in Figs. 2 and 6.

The shaft 9 extends through a vertical portion 1 of the main frame of the attachment where it has mounted fast thereon a pair of sprocket wheels 62 and 63 of different sizes either one of which is adapted to receive a sprocket chain 64 which passes around a sprocket wheel 65 on a stud shaft 66 which is carried by a swinging frame embodying outer and inner parallel bars 67 and 68 irrespective, connected together by a head piece 69. Fast on the hub of the sprocket wheel 65 is a traction wheel 70 by means of which the shaft 9 is driven and adapted to impart motion to said dropping mechanism when the clutch 50 is thrown into engagement with the pin 52. The traction wheel may be of any suitable size and is provided with traction ribs or teeth 71 on the periphery thereof. The frame comprising the side bars 67 and 68 is fulcrumed on the shaft 9 and is held at the desired angle by means of an adjusting stay bar 72 provided with a series of holes 73 adapted to receive a bolt 74 connected with the main frame of the attachment as shown in Fig. 3. The stay bar has a pivotal connection at 75 with the upper end of the frame carrying the traction wheel 21. After the attachment has been mounted on the cultivator and adjusted to the proper height, the frame just described is adjusted as to its angle relatively to the main frame of the attachment so as to dispose the traction wheel 70 to the proper elevation to be acted upon and rotated by contact with the ground over which the machine is being drawn. The pin 52 may be made of wood if desired so as to break readily when the apparatus is subjected to undue strain, thereby preventing permanent injury to the mechanism.

Having thus described the invention, what is claimed as new, is:—

1. A seed planting attachment for cultivators and the like comprising a seed hopper, a horizontally sliding feeder movable in the bottom thereof, a cut off for the seed feeder, and a vertical reciprocating dropper provided with a cut off device and adapted to receive the seed from the feeder and discharge the same.

2. A seed planting attachment for cultivators comprising a seed hopper, a horizontally sliding feeder for discharging the seed therefrom, a cut off for said feeder, a vertically reciprocating seed dropper adapted to receive the seed from the feeder and discharge the same, and an automatic cut off for alternately opening and closing the discharge orifice of the seed dropper.

3. A seed planting attachment for cultivators comprising a hopper, means for discharging a predetermined number of seed therefrom in each cycle of operation of the mechanism, a vertical reciprocating seed dropper adapted to receive the seed from the hopper, an automatic cut off controlling the discharge orifice of the seed dropper, said cut off being movable with the seed dropper, and means for stopping said cut off at a suitable point in the throw of the seed dropper so as to uncover the discharge orifice thereof, substantially as described.

4. A seed planting attachment for cultivators comprising a hopper, a horizontally sliding feeder operating in the bottom thereof, a vertically reciprocating seed dropper adapted to receive the seed from the feeder and discharge the same, a vertically sliding cut off mounted on the seed dropper and controlling the discharge orifice thereof, a stem on said cut off, and a stop device associated with said stem whereby it is adapted to automatically cover and uncover the discharge orifice of the dropper during the up and down movement of the latter.

5. A seed planting attachment for cultivators comprising a hopper, a horizontally sliding feeder working in the bottom thereof, a vertical reciprocating dropper having a seed passage terminating in inlet and discharge orifices and adapted to receive the seed from the feeder, a shoe carried by said dropper, a vertically movable cut off mounted within said shoe and controlling the discharge orifice of the dropper, a dropper guide or casing in which the dropper moves, and means connecting said cut off with the casing whereby it is adapted to follow the up and down movements of the dropper for a limited distance and to open and close the discharge orifice of the dropper at predetermined points.

6. A seed planting attachment for cultivators comprising a main frame, a transmission shaft journaled therein, means for rotating said shaft, a seed dropper adapted to be driven by said shaft, a clutch mounted on said shaft and provided with means for operating the seed dropper, and means for throwing said clutch into and out of engagement with the transmission shaft.

7. A seed planting attachment for cultivators comprising a main frame, a transmission shaft journaled therein, seed dropping mechanism actuated by said shaft, a traction wheel frame journaled on said shaft, a traction wheel carried by said frame, sprocket driving mechanism on said frame whereby the motion of the traction wheel is transmitted to the shaft of the attachment, and means for adjusting the angularity of the traction wheel frame.

8. A seed planting attachment for cultivators comprising a main frame, a transmission shaft journaled therein and provided with sprocket wheels of different sizes, a seed dropper adapted to be actuated by said shaft, a traction wheel frame journaled on said shaft, a traction wheel carried thereby, a sprocket wheel fast to the traction wheel, and a sprocket chain adapted to connect the last named sprocket wheel with either of the sprocket wheels on the transmission shaft, substantially as described.

In testimony whereof I affix my signature in presence of two witnesses.

DESIRE J. KERGER.

Witnesses:
M. A. CHEFFER,
EMILE G. KERGER.